United States Patent
Carrasco et al.

(10) Patent No.: US 6,775,831 B1
(45) Date of Patent: Aug. 10, 2004

(54) SYSTEM AND METHOD FOR RAPID COMPLETION OF DATA PROCESSING TASKS DISTRIBUTED ON A NETWORK

(75) Inventors: John Joseph Carrasco, Los Angeles, CA (US); Stephan Doliov, San Francisco, CA (US); Frank B. Ehrenfried, Millbrae, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 09/502,692

(22) Filed: Feb. 11, 2000

(51) Int. Cl.[7] ............................................. G06F 9/46
(52) U.S. Cl. ..................... 718/109; 718/100; 718/102; 718/106; 709/200; 707/3; 707/200
(58) Field of Search .......................... 709/100, 102, 709/106, 107, 200; 707/3, 200, 10, 103; 718/100, 102, 106, 107

(56) References Cited

U.S. PATENT DOCUMENTS

| | | | |
|---|---|---|---|
| 3,913,070 A | | 10/1975 | Malcolm et al. |
| 4,972,314 A | | 11/1990 | Getzinger et al. |
| 5,025,369 A | * | 6/1991 | Schwartz |
| 5,146,559 A | * | 9/1992 | Orimo et al. |
| 5,291,613 A | * | 3/1994 | Hirasawa et al. |
| 5,327,557 A | * | 7/1994 | Emmond ........................ 707/3 |
| 5,353,398 A | * | 10/1994 | Kitahara et al. ............ 345/759 |
| 5,394,394 A | * | 2/1995 | Crowther et al. ........... 370/392 |
| 5,495,618 A | * | 2/1996 | Cok |
| 5,687,372 A | * | 11/1997 | Hotea et al. |
| 5,706,500 A | * | 1/1998 | Dzikewich et al. |
| 5,778,367 A | | 7/1998 | Wesinger, Jr. et al. |
| 5,794,210 A | | 8/1998 | Goldhaber et al. |
| 5,812,793 A | * | 9/1998 | Shakib et al. |
| 5,862,223 A | | 1/1999 | Walker et al. |
| 5,864,680 A | * | 1/1999 | Edblad et al. |
| 5,944,779 A | * | 8/1999 | Blum |
| 5,946,463 A | * | 8/1999 | Carr et al. |
| 5,995,996 A | | 11/1999 | Venable |
| 6,088,705 A | * | 7/2000 | Lightstone et al. .......... 707/200 |
| 6,185,698 B1 | * | 2/2001 | Wesley et al. ................. 714/18 |
| 6,269,361 B1 | | 7/2001 | Davis et al. |
| 6,269,373 B1 | * | 7/2001 | Apte et al. ..................... 707/10 |
| 6,285,987 B1 | | 9/2001 | Roth et al. |
| 6,292,888 B1 | * | 9/2001 | Nemirovsky et al. ........ 712/225 |
| 6,336,118 B1 | * | 1/2002 | Hammond .............. 707/103 Y |
| 6,427,166 B1 | * | 7/2002 | Hurst et al. .................. 709/220 |
| 2002/0004735 A1 | | 1/2002 | Gross |

FOREIGN PATENT DOCUMENTS

| | | |
|---|---|---|
| GB | 2 274 345 A | 7/1994 |
| WO | WO 97/22066 A | 6/1997 |
| WO | WO 00/16218 A | 3/2000 |

OTHER PUBLICATIONS

Parkes et al. "Method and System for performing a task on a computer". US pat. app. Publication 2001/0005853 A1.*

(List continued on next page.)

Primary Examiner—Meng-Al T. An
Assistant Examiner—Lilian Vo
(74) Attorney, Agent, or Firm—Brinks Hofer Gilson & Lione

(57) ABSTRACT

A computer program and task request interface which enables large volumes of data to be processed efficiently and rapidly by multiple computers on a network. The data that requires processing can be in any format. The task request interface allows any arbitrary task to be performed on the input data. The number of computers which may participate in any given data processing task is essentially unlimited. The number of programs that can participate in the system is also essentially unlimited if the program uses run time evaluable code. Any computer operating system that runs a specified computer language interpreter can participate in the distributed processing of the input data.

30 Claims, 2 Drawing Sheets

OTHER PUBLICATIONS

News of The Week articles, *Telephony*, May 1, 1995, pp. 8 and 10.

Nuts 'N Bolts articles, *Target Marketing*, Oct. 1997, 1 page.

DoubleClick TestIt!, obtained at the internet address: web.archive.org/web/19980205034316/www.doubleclick.com/nf/adinfo/testiset.htm, dated Oct. 16, 2002, 4 pages.

DoubleClick Frequently Asked Questions, obtained at the internet address: web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, *Simba Information, Inc.* Apr. 28, 1998, 2 pages.

Google Search, communication from Jeffrey Brewer at Jeffrey@goto.com, titled "Need reverse stemming software", dated May 27, 1998, obtained at the intenet address: ://groups.google.com/groups?selm=356CEE4A8D E882A8%40goto.com, on Dec. 19, 2002, 1 page.

Ketchpel, Steven P. et al. "U–PAI: A Universal Payment Application Interface", conference material article from the Second USENIX Workshop on Electronic Commerce Proceedings, Oakland, California, Nov. 18–21, 1996, 17 pages.

Schwartz, Randal L., "Click–Through Tracking in Perl" *Web Techniques*, dated May 1998, located at the internet address: .webtechniques.com, 3 pages.

Van Roeden, Adriaan, "Your Own Search Engine With SWISH, A Custom Search Facility For Your Web Site", *Web Techniques*, dated Nov. 1996, located at the internet address: .webtechniques.com, pp. 63–66 pages.

Full Catalog—Categories Menu, Sun Microsystems Sun Solutions Catalog, obtained at the internet address: http://web.archive/org.web/19981205110211/solutions.sun.com/catalogs/all/index.htm, printed on Dec. 19, 2002, 2 pages.

Help on Making Queries—Search by Company or Product, obtained at the internet address: web.archive.org/web/19981203050002/solutions.sun.com/search–help.htm, printed on Dec. 19, 2002, 4 pages.

Online Updating, Sun Microsystems Sun Solutions Catalog obtained at the internet address: web.archive.org/web/19990220190636/solutions.sun.com/editmodule/help.html, printed on Dec. 19, 2002, 2 pages.

Press Release article titled "GoTo.com Announces First round of Financing, Totaling More Than $6 Million, Led by Draper, Fisher Jurvetson", *Business Wire*, dated May 19, 1998, printed form the Internet at <dialogclassic.com/main.vingw> on Nov. 9, 2000, 2 pages.

Ubois, Jeff, article titled "He who pays the piper . . . ", *MIDRANGE Systems*, vol. 9, No. 12, 1996, p. 50 (1), reprinted by Cardinal Business Media, Inc.

Chapin, S.J. et al. "The Legion Resource Management System", 5th *Workshop on Job Scheduling Strategies for Parallel Processing*, IPPS/SPDP '99 Conference in San Juan Puerto Rico, Apr. 1999, obtained from the Internet on Apr. 26, 2004 at: cs.huji.ac.il/~feit/parscged/parscged99.html>, 20 pgs.

Grimshaw, Andrew et al., "Architectural Support for Extensible and Autonomy in Wise–Area Distributed Object Systems", *Proceedings of the* 2002 *Network and Distributed Systems Security Symposium*, Feb. 2002, obtained from the Internet on Apr. 26, 2004 at: legion.virginia.edu/papers.html>, 34 pages.

Miaskowski, Stan, "Free utility guards against spyware", *CNN.com*, Jul. 20, 1999, obtained from the Internet on Apr. 26, 2004 at: cnn.com/TECH/computing/9907/20/spyware.idg/>, 2 pages.

First Office Action for corresponding Chinese Patent Application No. 01807736.6, dated Mar. 12, 2004, 5pp.

Supplementary Search Report for corresponding European Patent Application No. EP 00 936393, dated Feb. 20, 2004, 3 pages.

Examiner's Report for corresponding Australian Patent Application No. 2001241453, dated Feb. 24, 2004, 2pp.

Brin, Sergey et al., "The Anatomy of a Large Scale Hypertextual Web Search Engine", *Computer Networks and ISDN Systems*, North Holland Publishing, Amsterdam, NL, dated Apr. 14, 1998, pp. 1–20.

Doran, David, "Search Engines...Their popularity, their secrets, their flaws", *Entrepreneur*, Jul. 1998, p. 18.

Glaser, Ken, "Who Will GoTo.com?", *OnlinePress.com*, dated Feb. 20, 1998, 2 pages.

Kramer, Ralf et al., "Thesaurus federations: loosely integrated thesauri for document retrieval in networks based on Internet technologies", *Int. J. Digit Libr*, 1997, pp. 122–131.

Sullivan, Danny, "GoTo Sells Positions", *The Search Engine Report*, dated Mar. 3, 1998, 4 pages.

"GoTo.com Announces First Round of Financing, Totaling More Than $6 Million, Led by Draper Fisher Jurvetson", *Business Wire*, dated May 19, 1998, printed from Dialog Gale Group New products, 2 pages.

"New Service Puts Ad Auction, Search Engine Under One Roof", *Electronic Advertising & Marketplace Report*, dated Apr. 28, 1998, vol. 12, Issue 8, 2 pages.

Examination Report for corresponding Great Britain Application No. GB 0219491.8, dated Apr. 5, 2004, 4 pages.

Hipschman, Ron "How SETI@home works", obtained from the Internet at: web.archive.org/web/19991008152510/http://setihome.ssl.berkeley.edu/about.....>, on Feb. 4, 2004, 11 pages.

* cited by examiner

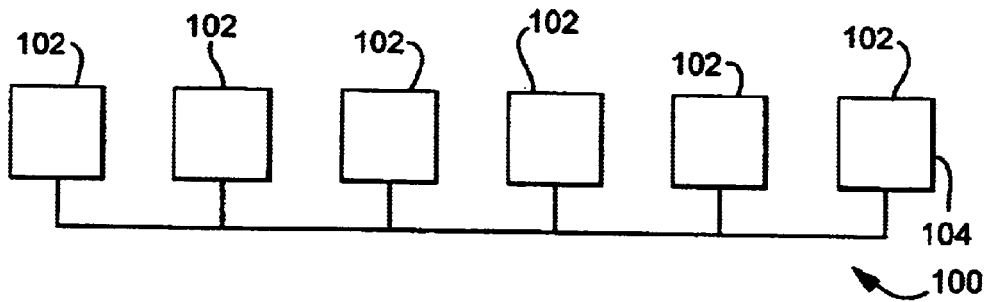
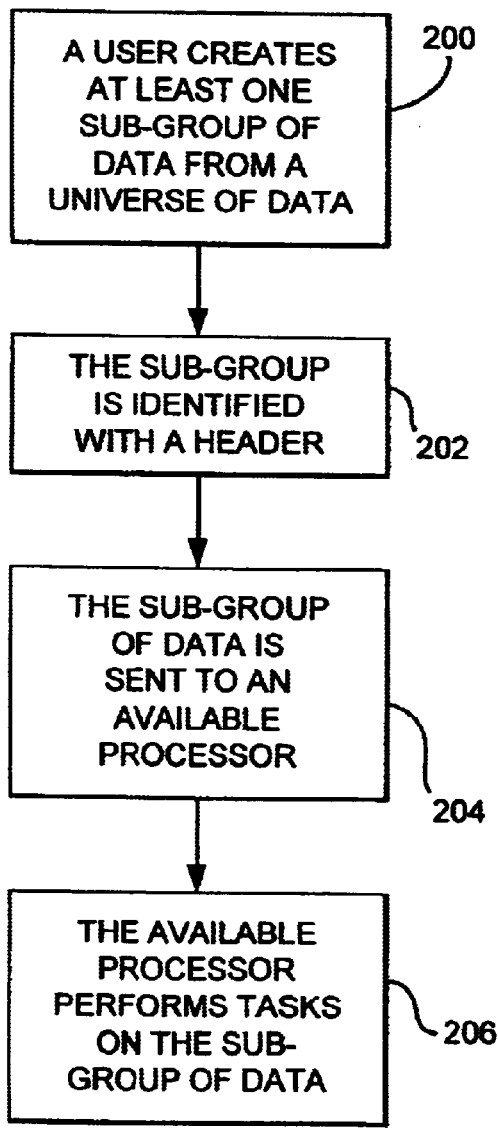
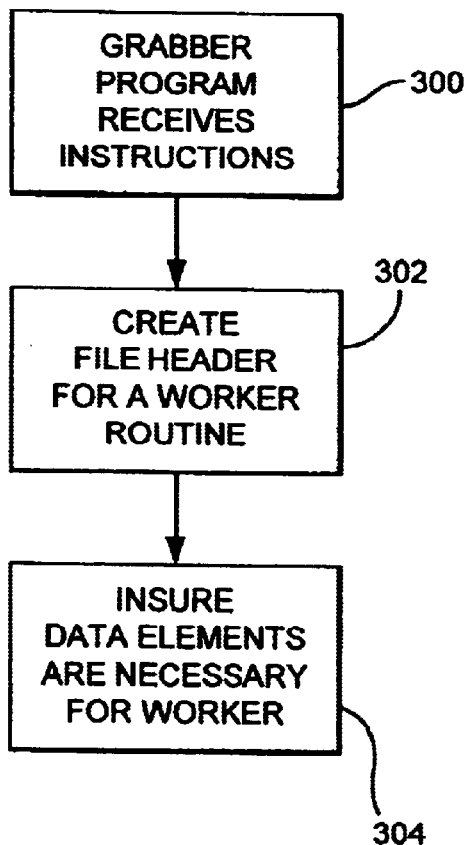

SYSTEM AND METHOD FOR RAPID COMPLETION OF DATA PROCESSING TASKS DISTRIBUTED ON A NETWORK

REFERENCE TO COMPUTER PROGRAM LISTINGS SUBMITTED ON COMPACT DISK

A compact disk appendix is included containing computer program code listings pursuant to 37 C.F.R. 1.52(e) and is hereby incorporated by reference. The compact disk contains program code files in ASCII format. The total number of compact disks is 2 and the files included on the compact disk are as follows:

| Creation Date | Creation Time | File Size (Bytes) | File Name |
| --- | --- | --- | --- |
| Mar. 23, 2004 | 4:27 p.m. | 41.5KB | Source Code 9623-166 |

BACKGROUND

Many commercial enterprises require that large volumes of data be processed in as short a time frame as possible. In recent years, businesses needing to process such large volumes of data have purchased very expensive, specialized multi-processor hardware, often referred to as mainframe computers, supercomputers or massively parallel computers. The cost of such hardware is often in the millions of dollars, with additional costs incurred by support contracts and the need to hire specialized personnel to maintain these systems. Not only is such supercomputing power expensive, but it does not afford the user much control over how any given task gets distributed among the multiple processors. How any computing task gets distributed becomes a function of the operating system of such a supercomputer.

In the field of data processing, often very similar operations are performed on different groups of data. For example, one may want to count the unique instances of a class, e.g., a group of data, for several different classes, know what the arithmetic mean of a given class is, or know what the intersection of two classes may be. In a supercomputing environment, one has to rely on the operating system to make sound decisions on how to distribute the various parts of a task among many central processing units (CPUs). Today's operating systems, however, are not capable of this kind of decision making in a data processing context.

Thus, there is a need for a system and method that overcomes these deficiencies.

BRIEF SUMMARY OF THE PRESENTLY PREFERRED EMBODIMENTS

According to the preferred embodiments, described is a system and method for allowing multiple processors, for example, a computer's central processing unit(s) (CPU), on a network to perform varying number and type of data processing tasks. Data processing tasks are provided to any of the available CPU's on a network equipped for the system and method. The system and method choose the first available CPU for performance of the data processing task. The system and method provide the task performing CPU with the minimum amount of data needed to complete the task and the necessary software instructions to complete the task.

More specifically, the preferred system and method allow for improved efficiency, in terms of both cost and time, of data processing. The user of the software considers a given data processing task, provides a set of definitions for the type of data required for each task, and specifies the task for a given group of data. The system and method then divide up the input file into the sub-task data files and ships the given data and task specifications to any available computer on the network. The CPU performs the task and returns the completed result to the computer that requested the task.

Thus, large amounts of data to be processed quickly, by ordinary, commodity personal computers, running conventional operating systems such as Windows NT or Unix. A small cluster of, for example, twelve dual processor computers or twenty-four single processor computers, running the software of the preferred embodiments, can equal, if not exceed the performance of a supercomputer with an equivalent number of CPUs.

BRIEF DESCRIPTION OF THE DRAWINGS

FIG. 1 shows an exemplary system for carrying out the present method in accordance with the preferred embodiments.

FIG. 2 shows an overview of the present method, in accordance with the preferred embodiments.

FIG. 3 shows a process flow for how the method constructs a work queue, in accordance with the preferred embodiments.

DETAILED DESCRIPTION OF THE PREFERRED EMBODIMENTS

Figure 4:
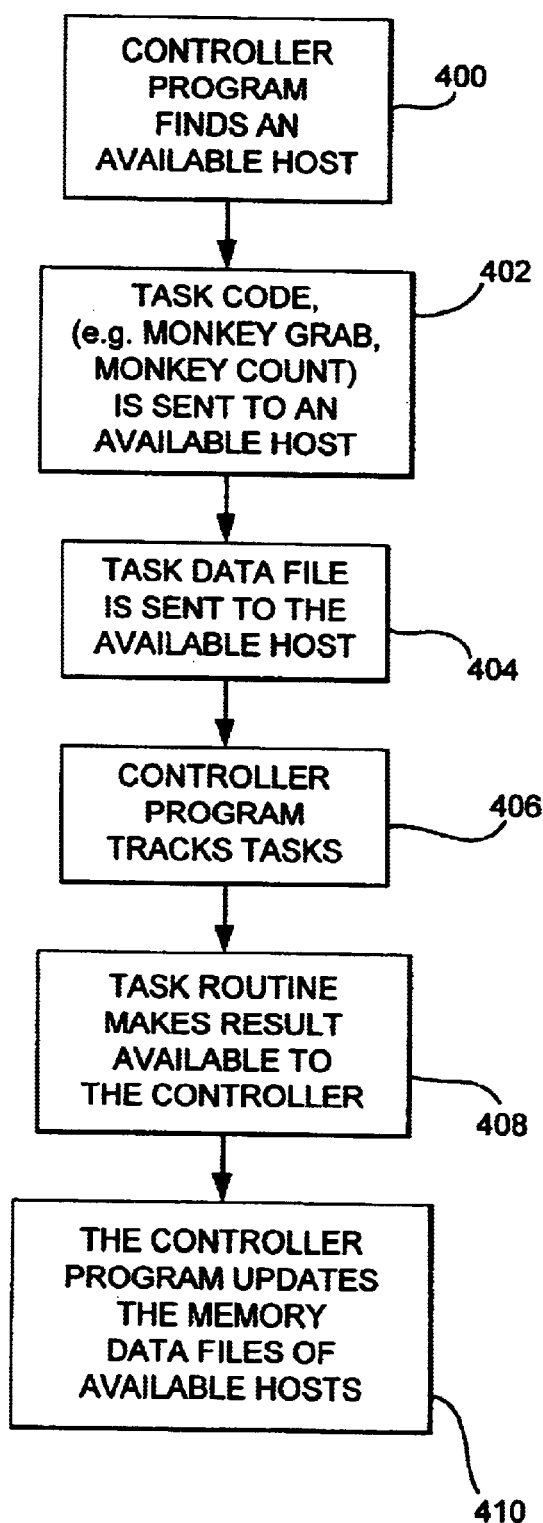
FIG. 4 shows a process of sending task data and task instructions to a computer on the network, in accordance with the preferred embodiments.

A preferred embodiment of the present system and method consists of two major components—a plurality of processing units on a network to perform data processing, and software to control the computers to each work on one discreet task within a larger task, also known as a master task. A task is a routine, such as a grabber routine, a worker routine and a reassembling routine, all described in more detail below. Preferred embodiments for both the network hardware and software are described herein. The present system can be used with search engines. One suitable search engine is described in co-pending application Ser. No. 09/322,677, filed May 28, 1999 entitled "System and Method for Influencing a Position on a Search Result List Generated by a Computer Network Search Engine," U.S. Pat. No. 6,269,361 which is incorporated by reference herein.

Referring to the drawings, and particularly FIG. 1, as an overview, a network, generally 100, of processors 102 are shown which perform the routines used in the present system. Those skilled in the art will appreciate that, in addition to a network, the processors 102 can be connected on a LAN, over the Internet, or the like. The processors 102 can be CPUs of commodity computers, super computers, laptops or the like. At least one of the processors 102 acts as a main processor 104. The main processor 104 can be any of the processors 102.

Referring to FIG. 2, the above system can be used to perform the present method. The present method takes a large universe of data and breaks the data down to smaller groups of data that are task specific (block 200). In other words, the smaller groups of data are tailored to include only that data which is needed for a particular task. For example, a user can prepare a task queue and a task data queue. The task queue defines which tasks are to be executed and the order in which the tasks are to be executed. The task data queue defines the data elements required for the completion of data processing tasks and how the data for the data processing tasks are laid out in a file so that the individual sub-tasks may readily be performed. Thereafter, the sub-group is identified with a header (block 202). The header is described in more detail below. The sub-group of data is then sent to an available processor (block 204). The available processor can then perform the required task on the sub-group of data (block 206).

Referring to FIG. 3, a grabber routine, referred to as monkeyGrab, located at the CPU which performs the grabbing task, receives instructions on which data elements to grab from a task data file created previously (block 300). The task data file is defined by a combination of a file header and data used by the routine. The grabber routine creates the file header that describes output data so that the worker routine can act on elements in the data file (block 302). The grabber routine insures that the only data elements in the data file are those which are required by a subsequent worker task (block 304). The grabber routine is described in more detail below.

Referring to FIG. 4, shown is the process for sending the tasks to the remote host. Software, for example, scans a memory database of available CPUs and the state of the available CPUs (block 400). Preferably, the first CPU in an available state is sent the task instruction file (block 402) and the task data file (block 404). The task instructions include a worker routine such as monkeycount, described in more detail below. The task data file could be the results of a routine like monkeyDeJournal, described below. Preferably, the controller routine creates a data file and memory entries to keep track of which available host is performing with task (block 406). Upon completing the task, the task routine makes the result data available to the controller routine (block 408). The controller routine waits for the task routine to indicate completion. Upon successful completion, the controller routine updates the memory data files of available hosts (block 410). Upon unsuccessful completion, however, the controller routine updates the data file and memory entries and reassigns the task to another available CPU.

Figure 5:
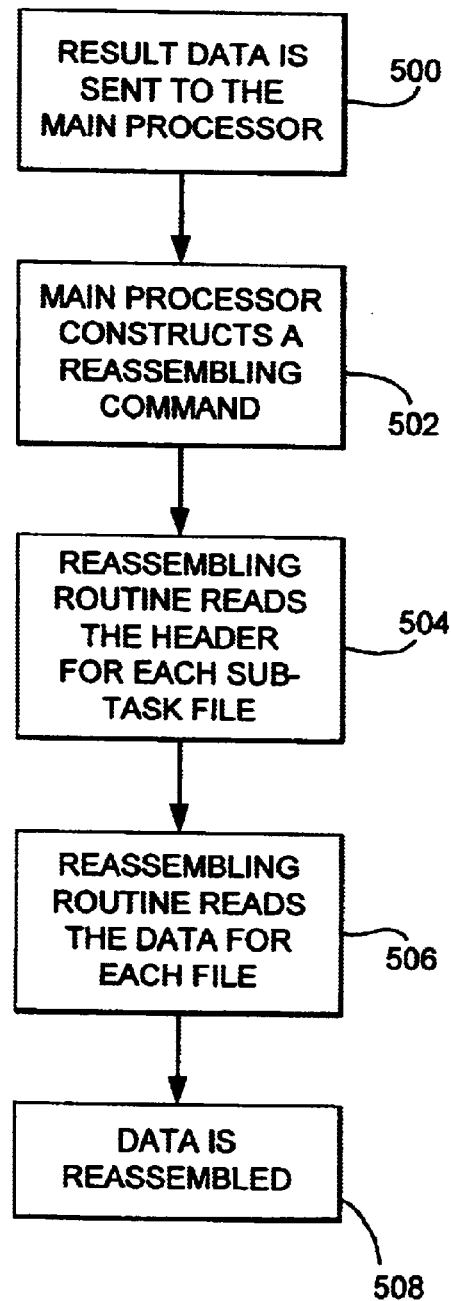
FIG. 5 shows a process for reassembling file results once the worker routines have completed their tasks, in accordance with the preferred embodiments.

As shown in FIG. 5, the data file which results from completing the task is sent back to the requesting computer, i.e., the main processor, to be reassembled with resulting data files from other completed tasks (block 500). The main processor constructs a reassembling command to specify the sub-task data files that will be reassembled into one file. (block 502). For each sub-task, reassembling code, e.g., monkeyjoin described below, reads and evaluates the file header to identify data columns defining keys and data (block 504). After having read the result file header for each sub-task, the reassembling routine reads a data line from each of the files and outputs the data values for the key in the data line if the keys match (block 506). If the keys do not match, the reassembling routine reads the file header for how to represent and handle the missing data values. Preferably, all task result files come from the same input data file, so there is no need to handle duplicate keys. The task result data files will contain only one of any given key. Likewise, it is preferred that the task routines are written to output the keys in sorted order, so not further sorting is required. Thereafter, the data is reassembled (block 508).

I. Hardware and Network.

Turning to a more specific example of the hardware, the preferred embodiment of the hardware is a set of commodity personal computers. So that a user works within a known environment, it is preferred that each computer contains a current model CPU, the same amount of memory, and at least one high-speed network interface card. Of course, other combinations could be used. For explanatory purposes, a preferred embodiment consists of twelve, dual CPU computers, with each CPU running at 500 MHz clock speed, 1 Gigabyte of Random Access Memory, and two 100 BaseT ethernet network adapter cards. Each computer in the cluster runs the RedHat Linux operating system. Those skilled in the art will appreciate that other operating systems could be used, such as Microsoft Windows and Window NT, Sun Solaris, and Macintosh. The twelve computers are connected to each other via a high-speed network switch. Each computer is also equipped with, for example, a SCSI II interface and a nine Gigabyte hard drive. Of course, many more computers could be added to the group without impairing performance.

II. Software

A preferred embodiment of the software consists of several separate computer programs, implemented in a language that is interpreted at run time, for example, the Perl programming language. Those skilled in the art will appreciate that other programming languages that are interpreted at run time could be used such as Java, PHP3, Python and Tcl/Tk.

As an overview, a first computer routine, referred to as the data preprocessing routine, reads the input data file, reads the task data queue control file, performs any number of arbitrary instructions which are specified in the task data queue file, and creates a file header and data file. A second computer routine extracts only the data fields required for a particular data processing task from the data file created by the first routine. The grabber routine creates a file that includes a file header segment and a data segment that a worker routine utilizes. The file header segment of the output data file includes executable or evaluable code. The third routine, the worker routine, performs computations on the data file created by the grabber routine. Preferably, the worker routine parses the file header created by the grabber routine and then performs a requested operation on the data portion of the file that follows the file header. Parsing includes reading the file header and evaluating the programmed code to generate a hash table that defines the structure of the data to follow. A hash table is a data structure that uses keys that map to data values.

Since many of the tasks performed by the software are tasks related to some kind of aggregation, e.g., counting the number of instances of a given class, the preferred embodiment of this invention includes a fourth software routine, which allows various task files to be merged. The task files are merged, so that, for a given class, all the aggregate measures are in one data row, which makes loading databases an easy task. Each of the four software routines is treated in more detail below.

A. Data Preprocessing Routine.

The data preprocessing routine, referred to in the Appendix as monkeyDeJournal, formats data selected by the user so that the data may easily be rendered into discrete parts required for processing. A preferred embodiment of the data preprocessing routine reads an input data file and a control file, returns groupings of data specified in the control file and outputs a new file which will be read by the other routines of this invention.

Reading the input data file is handled via an abstraction mechanism—the data preprocessing routine is pointed to an existing data file parsing routine. The only two assumptions made about the data file parsing routine is that it is capable of 1) identifying groupings of data and 2) returning such groupings of data in a hash table data structure. For example, if the input data file contains groups of data for user clicks on a web site (group: userClick) and groups of data for searches performed by a search engine (group: search), 'userClick' and 'search' would be keys in the hash table of all known data groupings for the input data file. These two grouping keys, in turn, each need to point to another hash table. The names of the keys in this hash table would be the names of the data elements, and the values would be the actual data value for that data element within a particular instance of a group. The group, 'userClick', could for example, contain data elements named 'timeStamp', 'IPAddress', 'rank', and 'AccountID'; the group named 'search' could for example, contain data elements named 'query', 'timeStamp', and 'resultsFound'. As the data file is read groups and their individual elements are returned based on the data in the control file which the data preprocessing routine must read.

The reading of the control file, and acting upon its data, is handled by the code of the data preprocessing routine. The control file is specified as a hash table evaluable at run time. The keys in this hash table hash table are arbitrary names, with each name representing a task queue. The values for these keys are hash tables also. This nested hash table has three required keys and any number of optional keys. The required keys are named 'event', 'columns', and 'delimiter'. The optional keys will be described later. The value for the key named 'event' specifies a group of data from the input file that contains the data elements of interest. The input data file parser identifies the group name. For example, the value for the key named 'event' could be 'userClick'. The key named columns points to another hash table. The keys of this nested hash table are the arbitrarily assigned column names that any later data processing tasks may need. The values of the column name keys are one innermost hash table, which allows the user to specify how to construct the columns of interest for a data processing task. This is done via two keys, one named 'source_args', the other named 'source_routine'. The 'source_args' key specifies the data elements from the data group which are to be used in constructing the desired output field; the 'source_routine' is specified as a valid Perl subroutine. Lastly, the key named 'delimiter' specifies how the data columns of interest are to be separated in the data segment of the output file. In the preferred embodiment, this control file would, at a minimum, be presented as follows:

```
{
'AdvertiserQueue' => {
'event' => 'userClick',
'columns' => {
'AdListingX' => {
  'source_args' => ['AccountID','rank',],
  'source_routine' => 'sub {
    my($ald)=shift @$_;
    my($rank)=shift @$_;
    my($x)="$ald###$rank";
    return $x;
    '},
  },
'IP_address' => {
  'source_args' => ['clientIP',],
  'source_routine' => 'sub {
    return shift@$_;
```

-continued

```
    '},
  },
'delimiter' => '/t',
},
}
```

In this example, 'AdvertiserQueue' is the arbitrary name assigned to the task data queue. The data group of interest comes from the group 'userClick'. Two output columns are desired: one referred to as 'AdListingX', the other as 'IP_Address'. The output column 'AdListingX' would consist of the data elements 'AccountID' and 'rank', which are part of the 'userClick' data group. The final presentation of the 'AdListingX' data column would be in the form of ABC###3, supposing the advertiser ID was 'ABC' and the rank was '3'. The output column 'IP_Address' would merely contain the data value that the data element 'clientIP' has from an instance of the data group 'userClick'. Those skilled in the art will recognize that any valid Perl syntax can be used in the 'source_routine' value to create derivations and modifications to input data fields of interest. The key named 'delimiter' having the value '\t' indicates that the output fields should be separated by a tab character.

In the present instance of this invention, the control file may include three additional, optional keys. These optional keys have the following names: 'deltaT', 'restriction_args', and 'restriction'. The 'deltaT' provides information to the data preprocessing routine about the earliest minute within an hour for which the output of the data preprocessing file should contain data. Legal values for this key are numbers between 0 and 59 inclusive; single digit numbers are preceded with a zero (i.e. if 1 is the value, spell out '01'). The 'restriction_args' key works just like the 'source_args' key previously mentioned. This value for this key provides input arguments to a user defined function. The elements of the list must be names of data elements within the data group of interest. The 'restriction' key value is a valid Perl subroutine. For example,

```
{
...
'deltaT' => '09',
'restriction_args' => ['bid',],
'restriction' => 'sub {
    my($x)=shift @$_;
    return ($x > 0);
    }',
...
}
``` specifies that the first data groups of interested to be included in the output file should occur no sooner than nine minutes after the first hour of data seen by the file parsing routine. The only data group instances to be returned are those whose 'bid' element has a value greater than zero. The 'bid' element is passed to the user defined function specified via the 'restriction' key.

Once the data preprocessing routine has read the control file and evaluated the contents, it creates an output file that begins with a file header segment. The file header segment is written in the form of a Perl evaluable hash table. This file header segment has four required keys and three optional keys that are discussed in the next section (B. Grabber Routine). After having output the fileheader, the data preprocessing routine enters a token named "EndOfHeader" on the next output line. At this point, any instances of data groupings which meet any restriction criteria are assembled according the rules specified in the control file and then written out to the data portion of the output file, with the columns being delimited by the delimiting character specified in the control file.

B. Grabber Routine.

According to a preferred embodiment of the grabber routine, referred to as monkeyGrab, the preprocessor routine utilizes the data for which the user wishes computations to be performed on and places these data in a file.

Thereafter, other routines that can read the file header with executable code, and execute the code, can read the data to be acted upon. Thus, a requirement of the grabber routine is to be able to read the file header created by the preprocessing routine so it can extract the appropriate data elements. Since the grabber routine also writes the minimum amount of data needed for a given task to a task file, the grabber routine can write out a file header which is bound by similar rules as the preprocessing routine's file headers.

The grabber routine grabs data columns based on column names that are provided through input arguments delivered to the grabber routine. For example, a data file may contain a column containing a price value, such as a search result bid column, and a column containing a class descriptor, a key field that may consist of one or many fields. In such a case, the grabber routine could be invoked as follows: "grab -g price -g myKeyField". The data file from which the grabber routine works has in its file header entries for the columns named "price" and "myKeyField". The file header from the preprocessed routine should contain the appropriate header entries, i.e., the key names for the hash table which describes the data columns. The grabber routine reads the header information from the data file to obtain information about the location within the data file of the column locations, the character(s) which delimit the data columns, and any special handling rules, such as how to treat or value an empty column location. Once the grabber has ascertained the column locations and what processing rules are required for a given column, the grabber routine loads those columns of interest and places them in an output file.

The output file, written by the grabber routine, has header information pertinent to the extracted columns. For explanatory purposes, the header is in the form of a Perl hash table with four keys in it. The four keys correspond to four of the seven keys included with the output of the preprocessor routine. These four keys are for the data columns, which of the data columns, or group of columns, make a given data row unique, the data column labels, and the output data field delimiter. The key for the data columns points to a second hash table. The second hash table has as its keys column names, and as its values a hash table with two keys. The first key of the innermost hash table describes the data column's location in the data portion of the file, where the innermost hash table is the most embedded hash table in a series of hash tables. The second key of the innermost hash table describes how to represent null data values.

The key for the column which uniquely describes any given data row must have the name of the column that describes the data row. This name is a key in the hash table of columns. The key for the data column labels has the value of the Perl list. Lastly, the key describing the column delimiter has a value corresponding to the column delimiter. If this column delimiter includes any characters which are escape sequences in Perl, then these escape characters are preceded by a backslash --"\"—character. The preferred embodiment places a token at the end of the file header, so that the software knows when it is done reading header information and when it can begin reading data.

C. Worker Routine.

A preferred embodiment of the worker routine(s), referred to as monkeycount, much like the preferred embodiment of the preprocessor and the grabber routines, reads the data file headers and also output such file headers. Like the grabber routine, the worker routine reads the file header to determine which columns it is reading and in what order those columns appear in the data segment of the input file, and which of the input data columns constitute the class, or key, definition. Upon reading this information, the worker routine performs the operation desired on the input data. If the worker routine is a counting routine, it will output, for each class, a count of the number of rows which belong to this class, along with a descriptor of a class. For example, if the input data consists of seven rows and two columns, a key and an item to be counted for that key, is as follows:

| Key   | Search Term |
|-------|-------------|
| Adv01 | dog         |
| Adv03 | cat         |
| Adv05 | house       |
| Adv03 | mouse       |
| Adv01 | travel      |
| Adv05 | music       |
| Adv01 | sound       | the output data file contains the following data rows:

| Key   | # searches |
|-------|------------|
| Adv01 | 3          |
| Adv03 | 2          |
| Adv05 | 2          |

Likewise, if the worker routine were an adding program, it would sum up the data values in the column of interest for each key of interest.

The worker routines minimize any given task in terms of file input/output and complexity, for example, if a count is requested, the worker routine only receives a key and the data element to be counted columns. This allows many worker assignments to occur on any arbitrary number of machines. One worker routine might count the total searches for each advertiser; another might count the number of unique IP addresses that clicked on any given advertisers listing within a specific time period. When the worker routine finishes its assignment, it writes out a file with the same header format as the input file, however, the values in the hash table describing the columns will be the key descriptor from the input file and name of the worked upon data. For example, if the input data file had a key of "Advertiser ID" and a column of "Search Term" and the worker routine was set up to count the number of searches which returned a given advertiser, the output file would have a key of "Advertiser ID" and a column of "Count of Searches".

D. Data Reconstruction Routine.

According to a preferred embodiment of the data reconstruction routine, referred to as monkeyjoin, all fields are reconstructed into one file, organized by key. The reconstruction occurs after the data to be worked on has been preprocessed, i.e., broken up into smaller work units, and the small work units are sent to machines on the network for processing. The data reconstruction facilitates convenient database loading. To accomplish data reconstruction, the data reconstruction routine is given input as to which data files need to be merged into one data file. Each of the data files that will become part of the database load file is supplied as an argument to the data reconstruction routine, in list format. For example, the data reconstruction routine, e.g., monkeyjoin, is called as follows:

reconstruct file1 file2 file3 . . . fileN

For each of the files supplied as an input argument, the reconstruction routine reads the file header information and stores the header information and data in a hash table. Once all of the headers and data have been read, each of the key values are cycled through. For every input file that had a matching key, the corresponding output columns are written. If one of the input files did not have a key entry or a value, the handling of missing or undefined values is invoked and the reconstruction routine supplies an appropriate value, per the notation in the input file header hash table. This file is written out, as the other files, with header information in the format of a Perl hash table. The hash table contains the same four keys as the hash table headers supplied by the grabber and worker routines. The values for the keys of this hash table include the same basic four keys required by this application: the columns hash table, the key hash table, the column delimiter specification and the hash table of column labels.

E. Dispatching Routine.

According to a preferred embodiment of the workload distributing routine, referred to as monkeyDispatcher, the CPU and computer memory intensive work occurs in the worker routines which perform the operations of interest, for example, counting unique instances within a class. This CPU and memory intensive work ideally is distributed to a number of computers. Preferably, the present system and method dispatches work to available computers on a network based on the distributing software's known usage load of the computers on the network. The dispatch routine allows one worker or grabber routine to run for each CPU of a computer attached to the network. For example, if there are twenty four counting operations to be performed, and there are twelve computers each equipped with two CPUs, two worker operations can be farmed off to each of the twelve computers for simultaneous processing to ensure the most rapid possible completion of the counting tasks. Likewise, the dispatcher routine needs information regarding which tasks or task components can be done simultaneously and which ones first require the completion of some other task component.

Thus, the dispatching routine needs data about the machines which are capable of receiving the work orders, and how many work orders they may receive at once. For example, a four CPU machine could receive four orders at a time, a one CPU machine only one. The routine also stores data about 1) which machine is currently performing how many tasks at any given point in time and 2) which task(s) any of these machines is performing at any given point in time. Lastly, the dispatch routine can initiate the launching of code for processing the data on a remote machine.

The preferred embodiment begins with a data file, written as a Perl hash table, which specifies the names of the available machines on the network and the total number of CPUs on the given machine. Also specified is the last known "busy/idle" state of each of the CPUs on a given machine, the last known start time. For example, in integer format, an integer indicates that a task was started on a CPU and a blank value indicates that no job is currently running on a given machine's CPU(s). Each machine on the network has one key in this hash table. Each key in this hash table points to a second hash table, the second hash table having key entries for the number of CPUs known for the given machine and the number of CPUs currently occupied doing work for that machine. On the first construction of the hash table, the value for CPUs currently occupied doing work is zero.

Also in the data file the task queues are specified. The outermost key in this set of tasks hash table points to one or more hash tables which specify the components of a task, and whether or not these sub-tasks can be performed simultaneously. The keys of this outermost task hash table are simply integers, beginning with the number one, and incrementing by one for each task-set. Each of these numbered tasks points to yet another hash table, which contains keys to represent aspects of the task (such as data preprocessing, data grabbing/counting, data joining etc.). A preferred embodiment wraps these individual task keys inside a hash table whose single present key is named, for example, 'parms'. The 'parms' key points to a hash table with four key entries: 'key', 'name', 'tasks' and 'masterTaskFile'. These keys have the corresponding values, a descriptor of the column which constitutes the class level key, e.g., Advertiser ID, a tokenized, that is, a predefined representation of the data preprocessing task (for example, dejournal.lineads to represent the task list pertaining to the reduction of advertiser listings in an internet search engine), the list of paired "grabbing" and "counting" tasks which can be performed simultaneously, and the name of the output file of the data preprocessing routine.

According to a preferred embodiment, the dispatch routine reads in the control file to identify available machines on the network and the machine's availability. As a task is dispatched to a machine, the dispatching software updates its memory copy of the machine availability hash table. Thus, if a machine has two CPUs and the dispatching routine sent a task to the machine with two CPUs, the dispatching software would increment the number of busy CPUs from 0 to 1, to indicate that one job has been sent to the machine on a network. When the machine performing the worker routine task finishes the task, the dispatcher decrements the busy CPU value by one for the machine that performed the task.

With this mechanism in place, prior to assigning tasks to machines on the network, the dispatching software sorts the available machines by current tasks assigned to a machine. If machine X on the network has 0 busy CPUs and machine Y has 1 busy CPU, and both machines X and Y have a total of two CPUs, then the dispatching software will preferably first assign a task to machine X. This occurs because machine X has no busy CPUs as far as the dispatching software can determine. Machine X could be running some CPU intensive software without the dispatching routines knowledge. It is preferred that the computers having the CPUs only have the necessary operating system software running, to prevent the problem of work being sent to a computer whose processor is tied up with a non germane task, such as a word processing task. In the preferred embodiment, the computers only include an operating system, a program interpreter, such as a Perl interpreter, and a secure copying program, if necessary. If all machines on the network are equally busy, the dispatching software sorts the stack of available machines by machine name and assigns tasks in that way. If a machine is fully occupied, the dispatching software removes this machine from the available machine stack until the busy machine reports that it has finished at least one of its assigned tasks.

If all machines are busy, the dispatching software waits for a first time period, for example, a few minutes, to retry task dispatching. If the dispatcher software has tasks queued but cannot find an available machine after a second time period, for example, fifteen minutes, the dispatcher software creates a warning message. This condition might indicate a larger system failure that would require resetting the software system and the tasks. The preferred embodiment of this invention supplies enough hardware on a network so that all pieces of hardware on this network are not likely to be completely busy for any given fifteen minutes.

Once the dispatching software identifies the machine assigned a given task, the dispatching software begins assembling a set of commands to be executed on a remote computer. The command set the software assembles is specific to a task, guided by the information provided in the dispatching software's control file. The construction of these commands is specified as follows. The machine creates a name that will uniquely identify a task and the machine on which the task is to be run. This name then gets used as the directory entry mark which the software uses as an indication that a task is either running or completed. After constructing the unique name, the dispatching software uses the syntax of the freely available secure shell utility (also known as ssh) to create the command which will launch a program on a remote computer. Those skilled in the art will recognize that other existing utilities, such as remote shell execution (also known as rsh) could as readily be used.

In its present form, the preferred embodiments have the computers on the network access shared disk space, so that the remote computer references the shared disk space for program code and data. Again, those skilled in the art will recognize that using existing network and remote execution tools, both program code and data could be copied to a remote computer's private disk. Thereafter, a remote execution utility could point the worker computer to the new location of the program code and data. Lastly, the dispatching software adds the syntax of the commands to remove the file and mark it created upon completion of the remotely executed task. Once this syntax is constructed, the dispatcher routine creates a copy of itself (known as forking) and overwrites this copy with a call to the constructed commands (known as a fork-exec combination). Pseudo-code is used to illustrate this process:

$task="NumUniqueUsers";
$machineToUse="machine07";
$programToLaunch="monkeyGrab";
$dataFileToUse="AdvertiserReport"
$programArguments="-g AdvertiserID -g $task";
$programLocation="/shared/disk/space/code";
$data Location="/shared/disk/space/data";
$dirEntryFileMark="$task. $machineToUse. system (\"date\")";
$remoteExecutionTool="ssh";
$remoteExToolArgs="-secret/secrets/myKeyFile";
$commandSet="touch $dirEntryMark; x='$remoteExecutionTool $remoteExToolArgs $machineToUse '$programToLaunch $programArguments $dataFileToUse"; if [$x eq 0]; then rm $dirEntryMark; fi";
forko( )
exec("$commandSet");

If the dispatcher routine's control file indicates that a particular process or process pair can be executed simultaneously, it loops over the steps just described to launch as many processes as are required by the control file and that can be handled by the existing network. If the control file indicates that a process must finish before one or more other processes must begin, the dispatcher routine waits for such a serial task to finish before launching more serial or parallel tasks within a task queue.

F. Special Cases and General Extensibility

A preferred embodiment includes a special case of a worker routine, referred to as monkeyLoad. Like all the other worker routines that can be created in the framework of the present system and method, monkeyLoad has the capability of parsing file headers which are in the form of Perl evaluable code. This monkeyLoad routine takes the file header information and creates a set of SQL (structured query language) statements to insert the data which follows the file header into a database. Through a set of standardized and freely available database interfaces for the Perl language, this routine can read the data lines in the output file and insert these as rows into a database. Those skilled in the art will recognize that the worker routine could also read and evaluate the file header, for example, to produce a control file for another routine, which might have more efficient interactions with a database routine, such as Oracle's SQL loader routine (sqlldr). The special requirement of this routine is that the database columns match the column labels provided in the file header. This detail is attended to at the beginning of the process, in the initial control file which a user creates and where the user can specify arbitrary data column labels. Any given worker routine functions by reading in the file header information, evaluating it, and upon output, creating another file header which has a minimum number of keys, e.g., four which any of the worker routines needs to function.

The one special instance of a worker routine demonstrates that the present system and method can be generalized. Since the worker routines can parse the file header information, worker routines can accomplish many useful things. One can readily recognize that instead of being instructed to count unique instances, a worker routine could be written to add, subtract, divide, multiply, compute standard deviation and so forth. The unique functionality any such routine requires is the ability to evaluate the header information in a data file as executable code that translates into a hash table with a minimum number of keys.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

What is claimed is:

1. A computer implemented method for running tasks on a network, comprising:

creating at least one sub-group of data from a universe of data;

identifying the sub-group of data with a header, the header containing executable code;

formatting a control file for evaluation as a hash table at run time;

reading the control file to determine an availability of a processor;

sending the sub-group of data to the available processor; and performing tasks with the available processor to obtain result data using the sub-group of data and instructions contained in the executable code in the header.

2. The method according to claim 1, further including returning the result data files for each data sub-group to a main processor for possible further processing.

3. The method according to claim 2, wherein returned result data is reconstructed to form a single result data file which comprises many individual result data files.

4. The method according to claim 1 further including updating the control file by re-writing a new control file which indicates the status of the processor.

5. The method according to claim 1 further including:
assembling at least one command to be executed by the processor; and
sending the at least one command to the processor for execution.

6. The method according to claim 5, wherein the at least one command includes creating a name to identify tasks to run.

7. The method according to claim 1 further including marking a state of the tasks.

8. The method according to claim 7, wherein the state of the task comprises either running or completed.

9. The method according to claim 1 further including retrying, after a time period has elapsed, to determine if the availability of the processor if all processors were busy.

10. The method according to claim 9, wherein the time period comprises about fifteen minutes.

11. A computer implemented method for running tasks on a network, comprising:
creating at least one sub-group of data from a universe of data;
identifying the sub-group of data with a header, the header containing executable code;
formatting a control file for evaluation as a hash table at run time;
reading the control file to determine an availability of a processor;
sending the sub-group of data to the available processor;
performing tasks with the available processor to obtain result data using the sub-group of data and instructions contained in the executable code in the header; and
returning the result data to a main processor, wherein returned result data is reconstructed to form a result.

12. The method according to claim 11 further including updating the control file by re-writing a new control file which indicates the status of the processor.

13. The method according to claim 11 further including:
assembling at least one command to be executed by the processor; and
sending the at least one command to the processor for execution.

14. The method according to claim 13, wherein the at least one command includes creating a name to identify tasks to run.

15. A system for running tasks on a network, comprising:
a data preprocessing routine to create at least one sub-group of data from a universe of data;
a data header containing executable code that identifies the sub-group of data;
a control file capable of being read to determine an availability of a processor, wherein the control file is formatted for evaluation as a hash table at run time; and
a dispatch routine to send the sub-group of data to the available processor, wherein the available processor performs to obtain result data using the sub-group of data and instructions contained in the executable code in the header.

16. The system according to claim 15, further including a main processor to collect the result data files for each data sub-group.

17. The system according to claim 16, further including a data reconstructing routine to reconstruct the result data to form a result.

18. The system according to claim 15, wherein the dispatch routine updates the control file by re-writing a new control file that indicates the status of the processor.

19. The system according to claim 15, wherein the dispatch routine assembles at least one command to be executed by the processor and sends the at least one command to the processor for execution.

20. The system according to claim 19, wherein the command includes creating a name to identify the tasks running on the network.

21. The system according to claim 15, wherein the dispatch routine marks a state of the task.

22. The system according to claim 21, wherein the state of the task is either running or completed.

23. The system according to claim 22, wherein the dispatch routine retries, after a time period has elapsed, to determine the availability of the processor if all the processors were busy.

24. A system for running tasks on a network, comprising:
a preprocessing routine to create at least one sub-group of data from a universe of data;
a data header containing executable code that identifies the sub-group of data;
a control file capable of being read to determine an availability of a processor, wherein the control file is formatted for evaluation as a hash table at run time; and
a dispatch routine to send the sub-group of data to the available processor, wherein the available processor performs to obtain result data using the sub-group of data and instructions contained in the executable code in the header; and
a main processor to collect returned result data, wherein returned result data is reconstructed to form a result.

25. The system according to claim 24, wherein the dispatch routine updates the control file by re-writing a new control file that indicates the status of the processor.

26. The system according to claim 24, wherein the dispatch routine assembles at least one command to be executed by the processor and sends the at least one command to the processor for execution.

27. The system according to claim 26, wherein the command includes creating a name to identify the tasks running on the network.

28. The system according to claim 24, wherein the dispatch routine marks a state of the task.

29. The system according to claim 28, wherein the state of the task is either running or completed.

30. The system according to claim 29, wherein the dispatch routine retries, after a time period has elapsed, to determine the availability of the processor if all the processors were busy.

* * * * *